United States Patent
Ganwani et al.

(10) Patent No.: US 9,860,096 B1
(45) Date of Patent: Jan. 2, 2018

(54) SYSTEMS AND METHODS FOR CARRIER FREQUENCY OFFSET AND DRIFT CANCELLATION BASED INDOOR POSITION ESTIMATION

(71) Applicant: Marvell International Ltd., Hamilton (BM)

(72) Inventors: Vijay Ganwani, Maharashtra (IN); Swaroop Venkatesh, San Ramon, CA (US); Ankit Sethi, Maharashtra (IN); Sudhir Srinivasa, Campbell, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/241,775

(22) Filed: Aug. 19, 2016

Related U.S. Application Data (60) Provisional application No. 62/209,465, filed on Aug. 25, 2015.

(51) Int. Cl.
*H04W 24/00* (2009.01)
*H04L 27/20* (2006.01)
*H04W 4/04* (2009.01)

(52) U.S. Cl.
CPC ............ *H04L 27/2082* (2013.01); *H04W 4/04* (2013.01)

(58) Field of Classification Search
CPC .................................................... H04L 27/2082
See application file for complete search history.

(56) References Cited

U.S. PATENT DOCUMENTS

2016/0047885 A1* 2/2016 Wang ........................ G01S 3/02
342/442
2016/0359507 A1* 12/2016 Gerdin ................... H01Q 3/267

\* cited by examiner

*Primary Examiner* — Justin Lee (57) ABSTRACT

Embodiments described herein provide a method for carrier frequency offset and frequency drift cancellation based indoor position estimation. A wireless signal including a plurality of data samples is received at a receiving antenna and from a mobile device. Information relating to an antenna switching pattern for transmitting or receiving the wireless signal may then be obtained from the wireless signal. A phase difference is calculated associated with each data sample of plurality of data samples. Carrier frequency offset and frequency drift cancellation may be applied to the phase difference to obtain a compensated phase difference. A direction estimate of the mobile device may then be generated based at least in part on the compensated phase difference.

20 Claims, 5 Drawing Sheets

SYSTEMS AND METHODS FOR CARRIER FREQUENCY OFFSET AND DRIFT CANCELLATION BASED INDOOR POSITION ESTIMATION

CROSS-REFERENCE TO RELATED APPLICATION

This disclosure claims the benefit of U.S. Provisional Patent Application No. 62/209,465, filed Aug. 25, 2015, which is hereby expressly incorporated by reference herein in its entirety.

FIELD OF USE

This disclosure relates to an indoor positioning system that locates the position of a user device within an indoor environment.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Indoor positioning can be used to locate the position of a user device within an indoor environment, such as an office building. For example, the location positioning information can include floor and room information in a multi-story building. Such indoor positioning technique can also be used in asset tracking within an indoor environment. For example, a department store clerk can use indoor positioning to help a customer track the location of a sales item.

Public indoor positioning may adopt Bluetooth low energy (BLE) devices with multiple antennas. For example, the phase difference of a received signal at different receiving antennas can be used to determine the direction of the received signal, and the position of the transmitter of the received signal may thus be derived. However, due to oscillator frequency mismatch between a BLE transmitter and a BLE receiver, carrier frequency offset (CFO) may occur when the local oscillator signal at the BLE receiver does not synchronize with the carrier signal contained in the received signal. In addition, time-varying frequency drift may also occur as a result of the oscillator frequency mismatch. Such CFO and frequency drift may influence the measurement of the phase difference of the received signal at different antennas. As a result, the indoor positioning estimation may not be accurate.

SUMMARY

Embodiments described herein provide a method for carrier frequency offset and frequency drift cancellation based indoor position estimation. A wireless signal including a plurality of data samples is received at a receiving antenna and from a mobile device. Information relating to an antenna switching pattern for transmitting or receiving the wireless signal may then be obtained from the wireless signal. A phase difference is calculated associated with each data sample of plurality of data samples. Carrier frequency offset and frequency drift cancellation may be applied to the phase difference to obtain a compensated phase difference. A direction estimate of the mobile device may then be generated based at least in part on the compensated phase difference.

In some implementations, the plurality of data samples are quadrature samples obtained from the wireless signal.

In some implementations, the antenna switching pattern has at least two different switching patterns, and each of the two different switching patterns includes at least one reference antenna and at least one non-reference antenna.

In some implementations, when the antenna switching pattern is a first switching pattern, a first number of phase differences of consecutive data samples are summed from the plurality of data samples to obtain an estimate of residual carrier frequency offset and frequency drift. The estimate of residual carrier frequency offset and frequency drift is then subtracted from each phase difference to obtain the respective compensated phase difference.

In some implementations, the first number is equivalent to a number of transmitting or receiving antennas that are involved in the first switching pattern.

In some implementations, when the antenna switching pattern is a second switching pattern, phase wrap error correction is applied to a second number of phase differences of consecutive data samples from the plurality of data samples. Differences are calculated between the second number of phase differences of consecutive data samples after the phase wrap error correction. The compensated phase difference may then be obtained from the calculated differences between the second number of phase differences of consecutive data samples.

In some implementations, the compensated phase difference reduces residual carrier frequency offset and frequency drift from the phase difference to half.

In some implementations, the second number of phase differences includes consecutive pairs of phase differences.

In some implementations, a phase wrap error correction value is added to a pair of phase differences from the consecutive pairs of phase differences when the respective pair satisfies a threshold condition.

In some implementations, the threshold condition includes at least one of: a sum of signs of the pair of phase differences being non-zero; and a sum of absolute values of the pair of phase differences being greater than a programmable threshold.

In another embodiment, a system for carrier frequency offset and frequency drift cancellation based indoor position estimation is provided. The system includes a receiving antenna to receive, from a mobile device, a wireless signal including a plurality of data samples. The system further includes a demodulation module to obtain, from the wireless signal, information relating to an antenna switching pattern for transmitting or receiving the wireless signal. The system further includes a phase difference module to calculate a phase difference associated with each data sample of plurality of data samples. The system further includes a carrier frequency offset and frequency drift cancellation module to obtain a compensated phase difference from the calculated phase difference. The system further includes an indoor positioning module to generate a direction estimate of the mobile device based at least in part on the compensated phase difference.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for carrier frequency offset (CFO) and frequency drift cancellation based indoor position estimation. According to this disclosure, a CFO/frequency drift cancellation mechanism is adopted at a Bluetooth receiver device to improve the accuracy of the measurement of phase difference of a received signal at different receiving antennas.

Figure 1:
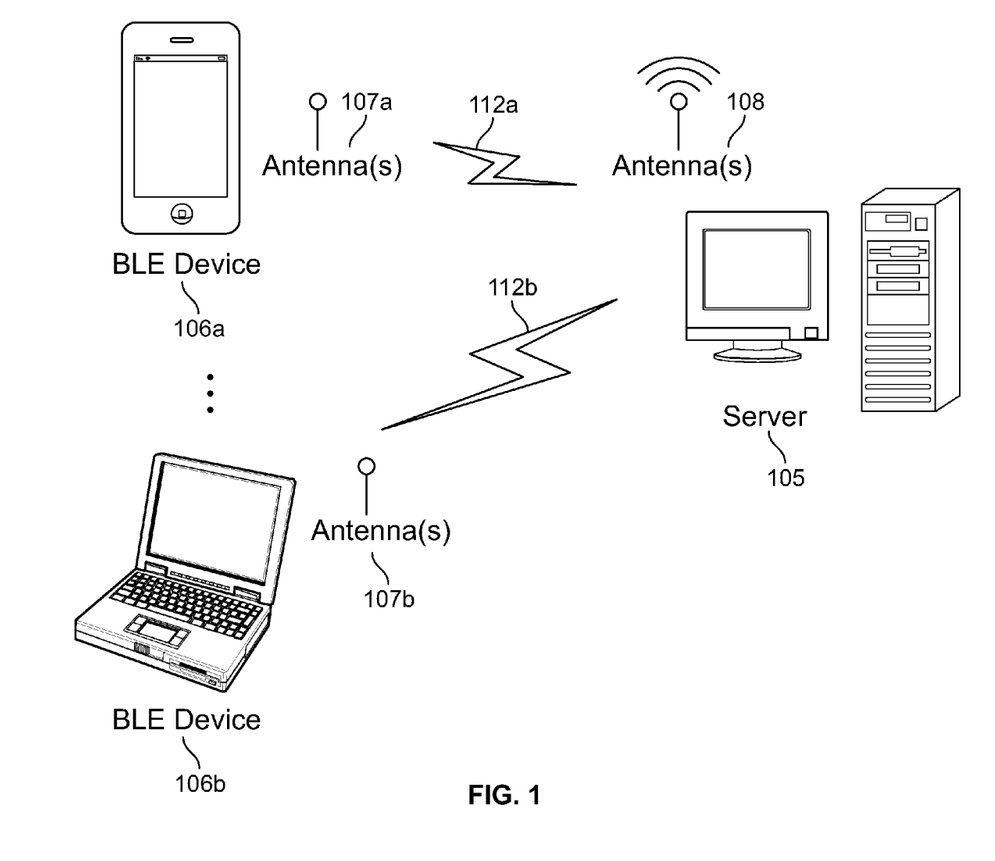
FIG. 1 provides an example block diagram illustrating an example indoor positioning system, according to some embodiments described herein.

FIG. 1 provides an example block diagram illustrating an example indoor positioning system, according to some embodiments described herein. Various BLE devices 106a-b, such as a mobile phone, a Smartphone, a laptop computer, and/or the like, may transmit a signal to a server 105 via transmitting antenna(s) 16a-b to the receiving antenna(s) 108. The transmitted signal 112a-b may be used for indoor position estimation at the server 105 based on the measured phases and amplitudes of the signals 112a-b. Two configurations are often used for the BLE device indoor positioning, e.g., the Angle of Departure (AOD) based configuration, or the Angle of Arrival (AOA) based configuration.

When AOD is used, the position of a BLE device having multiple transmitting antennas (e.g., the multiple antennas 107a) can be estimated by another BLE device (e.g., server 105 with a single antenna 108) with a single receiving antenna. When AOA is used, the position of a BLE device having a single transmitting antenna (e.g., a single antenna 107a) can be estimated by another BLE device with multiple receiving antennas (e.g., server 105 with multiple antennas 108). The data frame of an AOD/AOA enabled packet contains a special data file extension field (DFE) at the end of the packet (e.g., after the cyclic redundancy check (CRC) section in the payload). The respective AOD/AOA packet may be referred to as DFE packet. The DFE field consists of an all-ones sequence without any whitening. The DFE may have a range from 0 to 20 octets.

The multiple antenna transmitter (or receiver) on a BLE device may switch between the available transmitting (or receiving) antennas while transmitting (or receiving) the packet containing the DFE field. In fact, the DFE packet is transmitted (or received) from a single reference antenna till the transmission of the DFE field starts. Antenna switching is done only on the DFE field at a rate of 0.25/0.5/1 MHz. The antenna switching pattern and DFE length may be communicated to the receiver on a data unit (PDU), e.g., a data field ADV_PRA_IND.

The phase and amplitude differences estimated at the BLE receiver (e.g., the receiving server 105) due to transmitting antenna switching for AOD and receiving antenna switching for AOA may be used to detect the direction of the BLE transmitter (e.g., BLE devices 106a-b). However, the estimated phase differences can be severely affected with carrier frequency offset (CFO) and time-varying frequency drift due to oscillator frequency mismatch between the BLE transmitter and the BLE receiver. Thus, a CFO and drift cancellation based algorithm applied at the receiver (e.g., the server 105) is discussed in FIGS. 2-5 for different antenna switching patterns. It is noted that arbitrary phases are assumed at each antenna throughout the disclosure.

Figure 2:
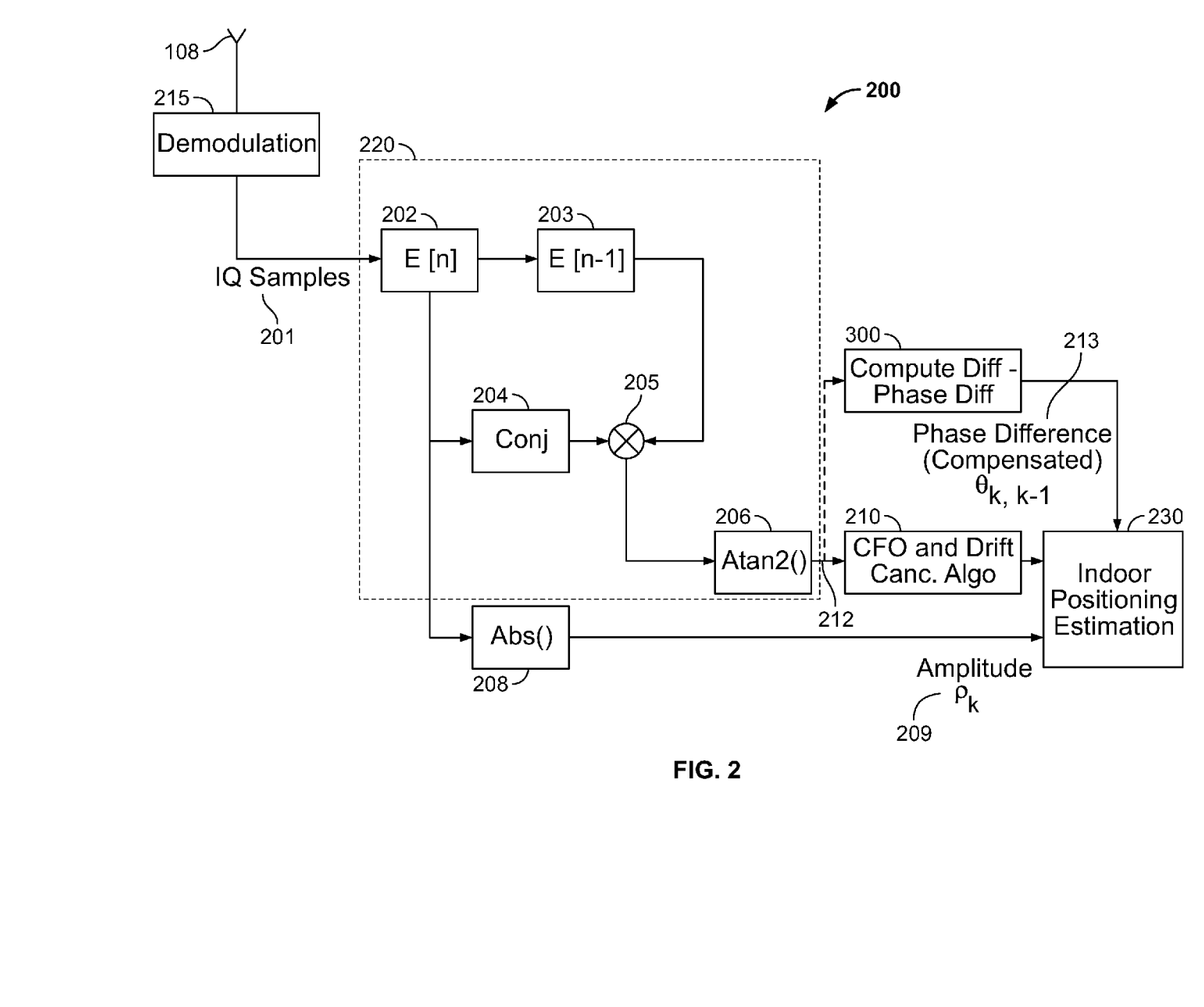
FIG. 2 provides a block diagram illustrating aspects of the CFO and drift cancellation mechanism 200, according to some embodiments of the disclosure.

FIG. 2 provides a block diagram illustrating aspects of the CFO and drift cancellation mechanism 200, according to some embodiments of the disclosure. The CFO and drift cancellation mechanism may be installed with a BLE device having one or more receiving antennas. A wireless signal may be received from the physical layer (PHY) at a receiving antenna 108 of the receiver device. The wireless signal may be passed to a demodulation module 215 to obtain IQ samples 201, which may take the form of "in-phase" and "quadrature-phase" samples. The IQ samples 201 may contain positioning information from the transmitter in the form of an absolute phase and an amplitude.

To estimate the direction of the transmitting BLE device, the phase difference (e.g., the output 212) of the received signal, e.g., the IQ samples 201, may be computed by a phase difference calculation module 220 from the absolute phase of the received signal. For example, various logic operators such as delay blocks 202-203, conjugate operator 204, multiplier 205, and an arctangent operator 206 may be included in the phase difference calculation module 220. A CFO and drift cancellation 210 may be applied after the calculation. At the phase difference calculation module 220, for example, an IQ sample 201 may be passed through delay blocks E[n] 202 and E[n−1] 203 such that the conjugate of the output of E[n] (obtained at the conjugate operator 204) is multiplied (at the multiplier 205) with the output E[n−1]. Thus, an arctangent operation 206 is performed on the complex number output of the product 205 to obtain the phase difference 212 of the received wireless signal.

For example, s(t) denotes the wireless signal received at the antenna 108, and s(t) is a Gaussian frequency shift keying (GFSK) signal (e.g., used for Bluetooth) with $f_o$ denotes CFO and $f_d$ denotes the drift rate; and $n_1(t)$, $n_2(t)$ and n(t) denote additive white Gaussian noise. Thus, when linear drift is assumed, the received signal can be represented as $$s(t) = \exp(j\theta(t) + j \cdot 2\pi(f_0 + f_d t)t) + n_1(t),$$

where $\theta(t)$ denotes the phase of the wireless signal s(t) at the time instance t, and $$\theta(t) = h\pi \sum_{k=-\infty}^{n-1} I_k + 2h\pi I_n q(t - nT); nT \leq t \leq (n+1)T$$

where h denotes the modulation index of the BLE signal; $I_k$ denotes the information symbols; and $$q(\tau) = \int_0^\tau g(t)dt$$

and g(t) is the Gaussian pulse shaping filter. In another example, if the frequency drift is sinusoidal drift, the wireless signal s(t) can be written as:

$$s(t)=\exp(j\theta(t)+j\cdot 2\pi(f_0+A\sin(2\pi f_d t))t+n(t)$$

where A denotes the frequency drift amplitude and $f_d$ denotes the drift rate.

Under the linear drift, when antenna switching rate is 0.25 MHz:

$$s(t)=\exp(j\theta(t)+j\cdot 2\pi(f_0+f_d t)t)+n_1(t) \text{ and}$$

$$s(t-4T)=\exp(j\theta(t-4T)+j\cdot 2\pi(f_0+f_d(t-4T))(t-4T))+n_2(t).$$

When the antenna switching rate is 0.25 MHZ, the phase difference at Ops can be bounded by:

$$<s(t)\cdot s^*(t-4T)=$$
$$\theta(t)-\theta(t-4T)+\underbrace{2\pi f_0(4T)}_{CFO}-\underbrace{2\pi f_d(4T)^2+2\pi(2f_d)\cdot t\cdot (4T)}_{drift}+\bar{n}(t)$$

where s*denotes the conjugate of s, which can be obtained at the conjugate operator 204; and $\bar{n}(t)$ denotes the average AWGN across different antenna transmission/receiving channels. In the discrete domain, the phase difference at Ops can be bounded by:

$$<s_{4n}\cdot s^*_{4(n-1)}=$$
$$\theta_{4n}-\theta_{4(n-1)}+\underbrace{2\pi f_0(4T)}_{CFO}-\underbrace{2\pi f_d(4T)^2+2\pi(2f_d)\cdot 4n\cdot (4T)}_{drift}+\bar{n}_{4n}$$

A CFO and drift cancellation algorithm may be applied to the calculated phase difference 212 based on the different antenna switching patterns. For example, when the transmitter uses four transmitting antennas, CFO and Drift cancellation algorithms may be applied to the following two generic antenna switching patterns: 1-2-3-4 . . . 1-2-3-4 . . . designated as Mode 0; and 1-2-1-3-1-4 . . . designated as Mode 1, where '1' denotes a reference antenna and "2," "3" and "4" denote non-reference antennas. The reference antenna may be used for BLE packet reception/transmission till the DFE field is being transmitted/received, and then reference antenna is switched to non-reference antennas to transmit/receive the DFE field.

When the transmitter or the receiver has 4 antennas to generate an antenna switching pattern of the Mode 0 type, e.g., 1-2-3-4-1-2-3-4-1, etc., the phase difference 212 at the input of CFO and drift cancellation block 210 (or in consecutive IQ samples) can be written as the following:

$$\delta_n=C+D(n)+\varphi_K-\varphi_{K-1}+\eta_n'$$

where n denotes the $n^{th}$ symbol being transmitted; C denotes the residual CFO; D denotes the frequency drift; $\varphi_k$ denotes the phase transmitted by $k^{th}$ antenna and $\eta_n'$ denotes the noise at $n^{th}$ symbol. Note that here the frequency drift for the $n^{th}$ symbol can be a function of the antenna switching time denoted by T and the frequency drift rate denoted by $f_d$, e.g., D(n)=F(n, T, $f_d$).

For example, when linear drift occurs with an antenna switching rate of 0.25 MHz, the drift function D(n)=F(n, T, $f_d$) can be given by:

$$D(n)=2\pi(2f_d)\cdot 4n\cdot 4T\cdot 2\pi f_{d'}(4T)^2, \text{with an antenna switching rate of 0.25 MHz;}$$

$$D(n)=2\pi(2f_d)\cdot 2n\cdot 2T\cdot 2\pi f_{d'}(2T)^2, \text{with an antenna switching rate of 0.5 MHz; or}$$

$$D(n)=2\pi(2f_d)\cdot n\cdot T\cdot 2\pi f_{d'}(T)^2, \text{with an antenna switching rate of 1 MHz.}$$

If the phase differences for first few consecutive symbols are written as:

$$\delta_2=C+D(2)+\varphi_2-\varphi_1+\eta_2' \ldots$$
$$\delta_3=C+D(3)+\varphi_3-\varphi_2+\eta_3' \ldots$$
$$\delta_4=C+D(4)+\varphi_4-\varphi_3+\eta_4' \ldots$$
$$\delta_5=C+D(5)\pm\omega_1-\varphi_2+\eta_5' \ldots$$
$$\delta_6=C+D(6)+\varphi_3-\varphi_2+\eta_6' \ldots$$

Thus, when there are four transmitting/receiving antennas, the sum of four consecutive phase differences, e.g., $\delta_2$, $\delta_3$, $\delta_4$ and $\delta_1$, results into cancellation of phase difference. Thus a good estimate of residual CFO and frequency drift (in degrees) can be given by:

$$cfodrift(n)=$$
$$\frac{\text{Mod}\left(\left(\sum_{i=n}^{n-NumAnt}\delta_i-NumAnt\cdot cfodrift(n-1)\right),360\right)}{NumAnt}+cfodrift(n-1)$$

where NumAnt denotes the number of transmitting antennas under AOD, or the number of receiving antennas under AOA, respectively; and the Mod( ) operator is applied to generate a relative cfodrift(n) estimate to prevent phase wrap error. Thus, the estimated cfodrift(n) may be subtracted from the phase difference 212 to obtain a compensated phase difference 213.

In another example, assume that the transmitter has 4 antennas to generate an antenna switching pattern of the Mode 1 type, e.g., 1-2-1-3-1-4-1 . . . . The phase difference 212 may be processed at the ComputeDiff_PhaseDiff block 300 as further illustrated in FIG. 3 to obtain the compensated phase difference 213. The compensated phase difference 213 and the amplitude 209 (obtained from the abs( ) operation 208) of the IQ sample from the $k^{th}$ antenna may then be sent to an indoor positioning estimation module 230 to estimate the direction of the transmitting device.

Figure 3:
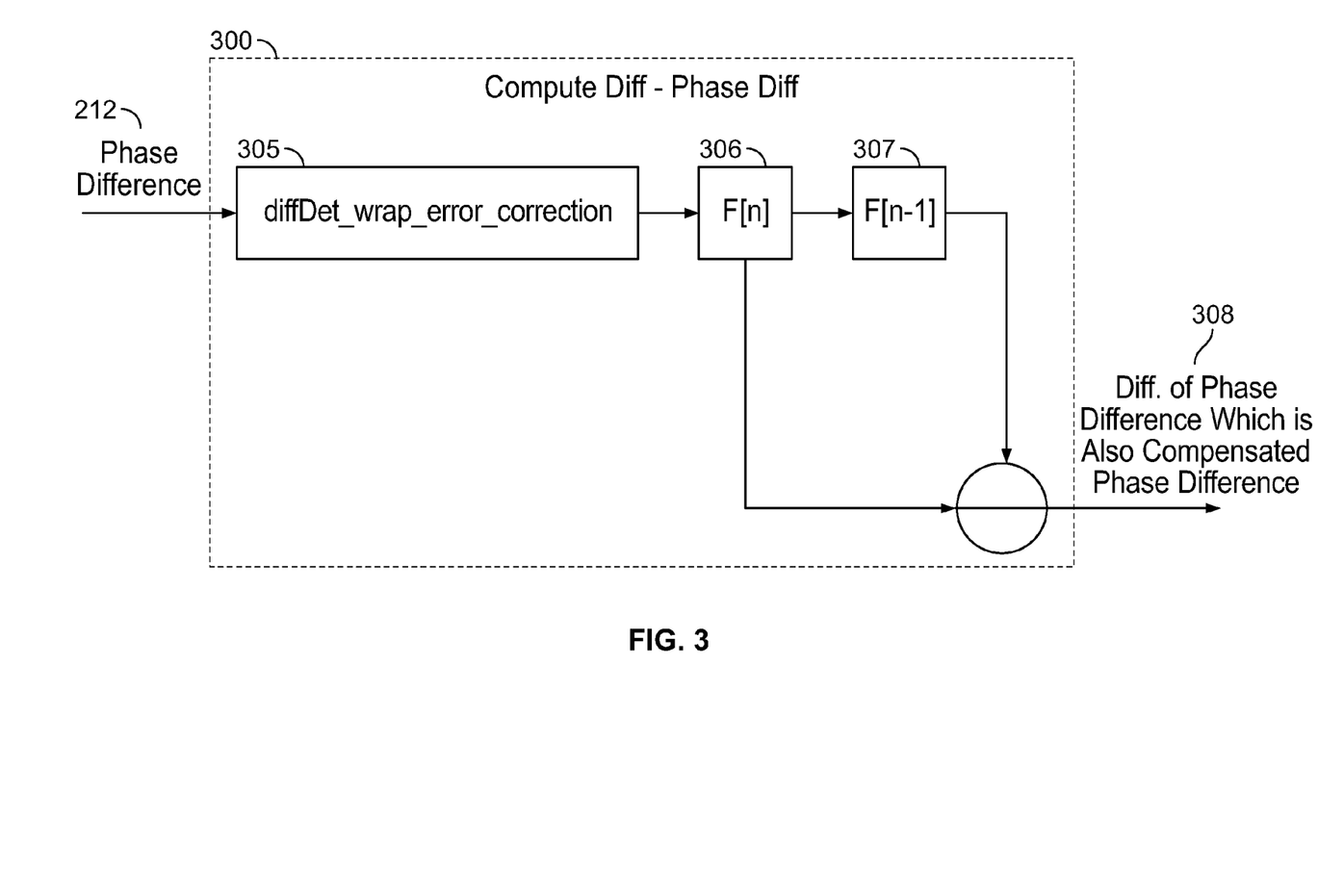
FIG. 3 shows an example block diagram illustrating aspects of calculating the difference of a phase difference under Mode 1, according to some embodiments described herein.

FIG. 3 shows an example block diagram illustrating aspects of calculating difference of a phase difference under Mode 1, according to some embodiments described herein. Under Mode 1 switching pattern, a ComputeDiff_PhaseDiff block 300 may be used to cancel CFO and drift on the phase difference 212. This block 300 may compute phase difference between consecutive samples to cancel constant CFO and reduce frequency drift by a half. For example, similar to Mode 0, the phase difference at the input of CFO and drift cancellation block 210 (or in consecutive IQ samples) can be calculated as:

$$\delta_n=C+D(n)+\omega_K-\omega_{K-1}+\eta_n'$$

and similarly, n denotes the $n^{th}$ symbol being transmitted; C denotes the residual CFO; D denotes the frequency drift; $\omega_K$ denotes the phase transmitted by $k^{th}$ antenna and $\eta_n'$ denotes the noise at $n^{th}$ symbol. The phase differences for first few consecutive symbols under Mode 1 can be written as:

$$\delta_2=C+D(2)+\omega_2-\omega_1+\eta_2' \ldots$$
$$\delta_3=C+D(3)+\omega_1-\varphi_2+\eta_3' \ldots$$
$$\delta_4=C+D(4)+\omega_3-\varphi_1+\eta_4' \ldots$$

Figure 5:
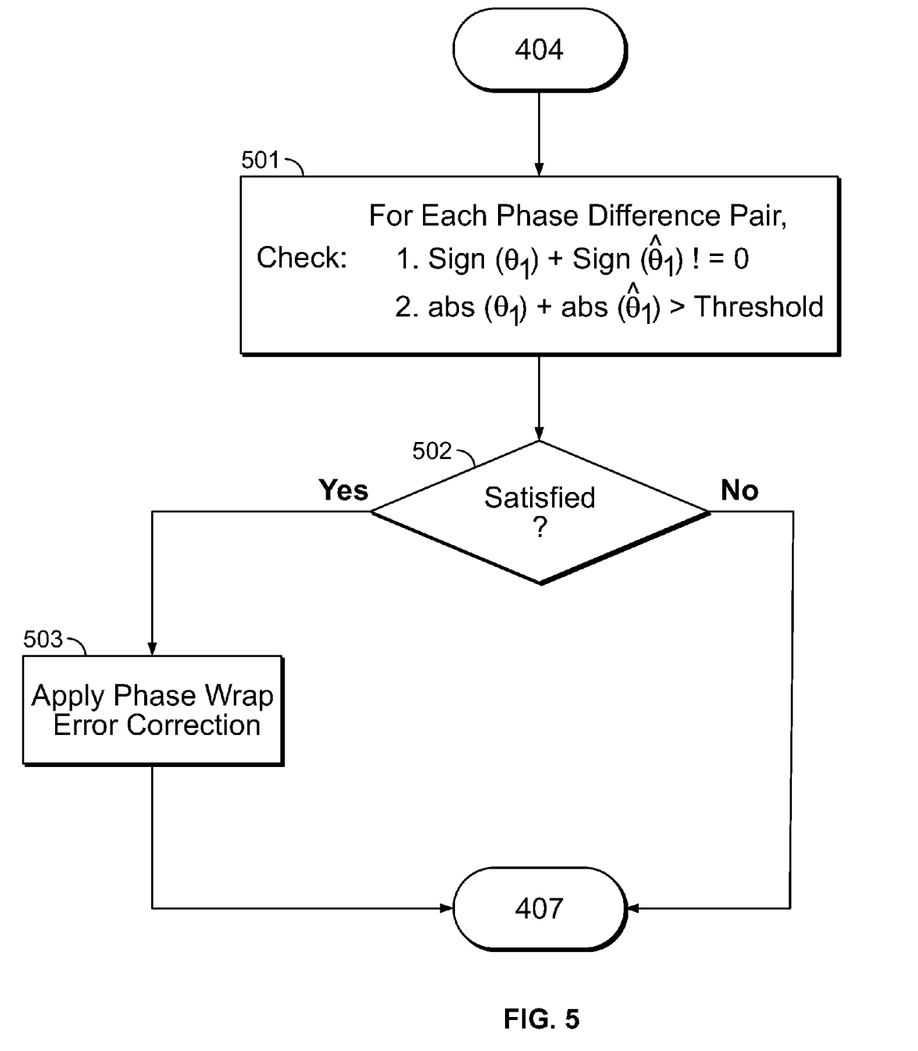
FIG. 5 provides an exemplary logic flow diagram illustrating aspects of phase wrap error correction 305 under Mode 1, according to some embodiments described herein.

$\delta_5 = C + D(5) + \varphi_1 - \varphi_3 + \eta_n' \ldots$ $\delta_6 = C + D(6) + \varphi_4 - \varphi_1 + \eta_6' \ldots$ Then, the phase difference samples $\delta_2, \delta_3, \delta_4, \delta_5, \delta_6 \ldots$ can be processed a wrap error correction block 305, which is discussed further in FIG. 5, and then passed to the delay blocks 306, 307 to calculate a difference between consecutive phase difference samples. The output 308 of the ComputeDiff_PhaseDiff block, e.g., the difference of phase differences, which is also compensated phase difference, can be given by:

$$\frac{(\delta_2 - \delta_3)}{2} = \frac{D}{2} + \underbrace{(\varphi_2 - \varphi_1)}_{\text{Desired Phase Difference}} + \frac{(\eta_2' - \eta_3')}{2} \ldots$$

$$\frac{(\delta_4 - \delta_5)}{2} = \frac{D}{2} + \underbrace{(\varphi_3 - \varphi_1)}_{\text{Desired Phase Difference}} + \frac{(\eta_4' - \eta_5')}{2} \ldots$$

Thus at the output of the ComputeDiff_PhaseDiff block 300, the original frequency drift is reduced to D/2.

Figure 4:
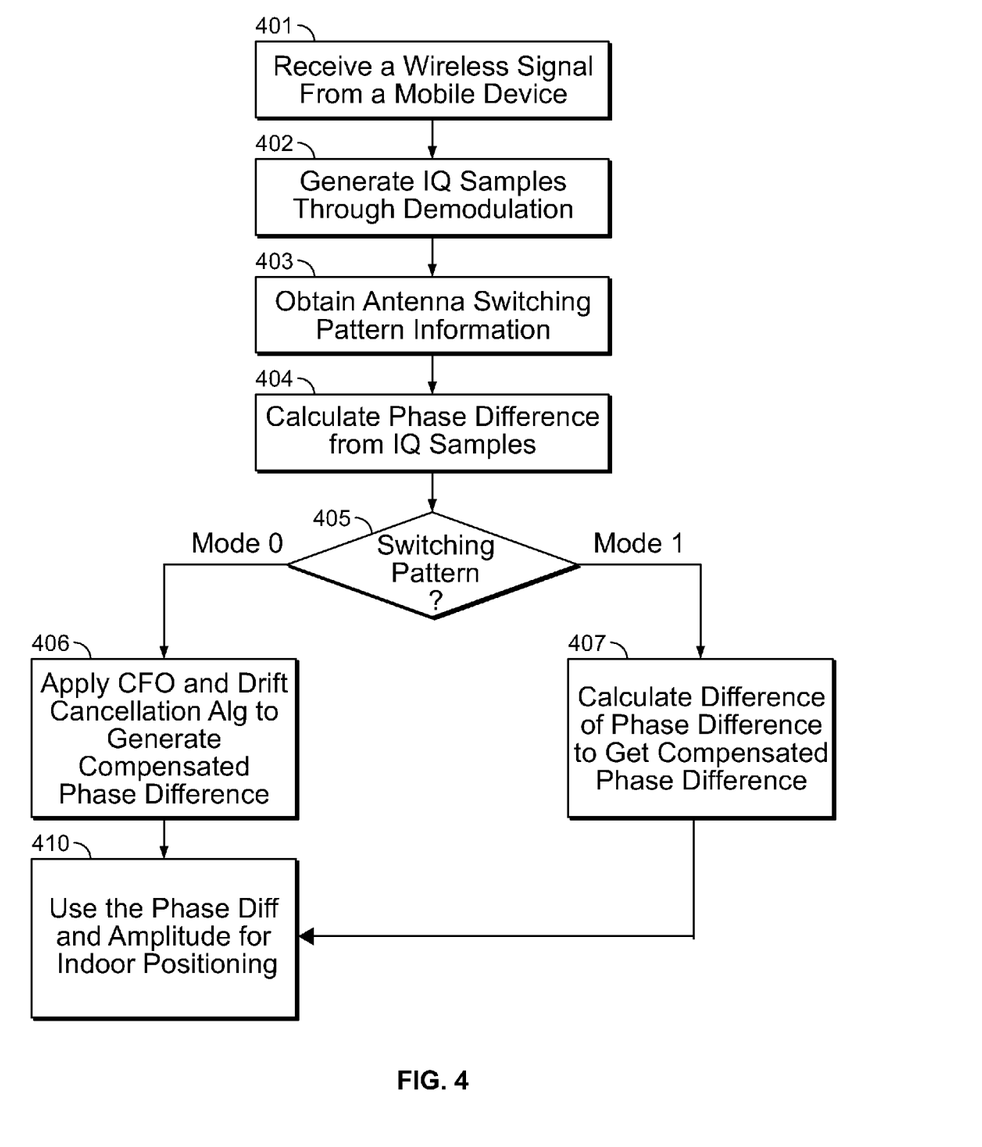
FIG. 4 provides an exemplary logic flow diagram illustrating an overall work flow of CFO and drift cancellation algorithm at a receiver, according to some embodiments described herein.

FIG. 4 provides an exemplary logic flow diagram illustrating an overall work flow of CFO and drift cancellation algorithm at a receiver, according to an embodiment described herein. At 401, a wireless signal (e.g., 112a-b in FIG. 1) may be received from a mobile device (e.g., a BLE device 106a-b in FIG. 1). At 402, IQ samples (e.g., see 212 in FIG. 2) of the wireless signal can be generated through a demodulation process at the receiver. At 403, antenna switching pattern information may be obtained from the IQ samples, e.g., Mode 0 or Mode 1 switching pattern. At 404, a phase difference (e.g., 212 in FIG. 2) can be calculated from the consecutive IQ samples.

CFO and drift cancellation may then be performed based on the antenna switching pattern at 405. If the antenna switching pattern is under Mode 0 type, at 406, the receiver may apply a CFO and drift cancellation algorithm to generate a compensated phase difference (e.g., see 213 in FIG. 2), as discussed in connection with Mode 0 operation at block 210 in FIG. 2. If the antenna switching pattern is under Mode 1 type, the difference of phase differences of consecutive IQ samples can be calculated at 407 to get compensated phase difference, as discussed in connection with FIG. 3. It is noted that although FIG. 4 shows two antenna switching pattern, but embodiments described herein can also be applied to other antenna switching patterns which can be deduced to the Mode-0 or Mode-1 switching pattern. For example, when there are more than four antennas, phase compensation for switching patterns that are similar to the Mode 0 or Mode 1 can be applied in a similar way.

At 410, the compensated phase difference and the amplitude of the IQ samples are used to estimate the direction of the transmitting device for indoor positioning.

FIG. 5 provides an exemplary logic flow diagram illustrating aspects of phase wrap error correction 305 under Mode 1, according to one embodiment described herein. Under Mode 1 switching pattern, a phase wrap error correction module 305 can be applied to reduce phase wrap error. For example, if $\varphi_1, \varphi_2, \varphi_1, \varphi_3, \varphi_1, \varphi_4, \varphi_1, \varphi_5 \ldots$ are the transmitted phases under Mode 1, the phase differences in IQ samples can be given by $\theta_1, -\theta_1, \theta_2, -\theta_2, \theta_3, -\theta_3 \ldots$, where $\theta_{n-1} = \varphi_n - \varphi_{n-1}$. However, due to phase wrap error caused by an erroneous output from the ComputeDiff_PhaseDiff block 300 in FIG. 3, the phase differences may be detected as $\theta_1, -\theta_1, \theta_2, 2\pi-\theta_2, \theta_3, -\theta_3 \ldots$ The phase difference (e.g., 212 in FIG. 2) in IQ samples obtained from 401 in FIG. 4 can be written as:

$$\left\{ \underbrace{\theta_1, -\hat{\theta}_1}_{1}, \underbrace{\theta_2, -\hat{\theta}_2}_{2}, \underbrace{\theta_3, -\hat{\theta}_3}_{3} \ldots \right\}$$

For each phase difference pair, the phase wrap error correction may be applied on set 1, 2, 3 . . . by checking whether following conditions are satisfied at 501, $$\text{sign}(\theta_1) + \text{sign}(\hat{\theta}_1) != 0; \text{ and} \qquad 1).$$

$$\text{abs}(\theta_1) + \text{abs}(\hat{\theta}_1) > m\_dfe\_diffDet\_wrap\_thresh \qquad 2).$$

Where m_dfe_diffDet_wrap_thresh is the programmable register with a default value of H. If the conditions (1) and (2) are satisfied, the phase wrap error correction is then done at 503 by adding $2\pi$ when if $\theta_1 < 0$ or $-2\pi$ if $\hat{\theta}_1 > 0$. After the phase wrap error correction is completed at 503, the work flow proceeds at 407 in FIG. 4.

The CFO and drift cancellation in phase difference calculation can improve the performance of positioning. For example, under Mode 0, when there are six transmitting or receiving antennas, and the antenna switching rate=0.25 MHz, an average error improvement of 11.4 degrees in phase difference estimate can be achieved as compared to the case when no correction was applied. For another example, under Mode 1, when there are ten transmitting or receiving antennas, and the antenna switching rate=0.25 MHz, an average error improvement of 12.6 degrees in phase difference estimate can be achieved as compared to the case when no correction was applied.

While this specification contains many specifics, these should not be construed as limitations on the scope of what may be claimed, but, rather, as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Suitable computer program code residing on a computer-readable medium may be provided for performing one or more functions in relation to performing the processes as described herein. The term "computer-readable medium" as used herein refers to any non-transitory medium that provides or participates in providing instructions to a processor of the computing device (e.g., the BLE device 106a-b, the receiving server 105, or any other processor of a device described herein) for execution. Such a medium may take many forms, including but not limited to, non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for carrier frequency offset and frequency drift cancellation based indoor position estimation, the method comprising:
    receiving, at a receiving antenna and from a mobile device, a wireless signal including a plurality of data samples;
    obtaining, from the wireless signal, information relating to an antenna switching pattern for transmitting or receiving the wireless signal, wherein the antenna switching pattern is selected from a set of antenna switching patterns, and each of the set of antenna switching patterns includes at least one reference antenna and at least one non-reference antenna;
    calculating a phase difference associated with each data sample of plurality of data samples;
    applying carrier frequency offset and frequency drift cancellation to the phase difference to obtain a compensated phase difference; and
    generating a direction estimate of the mobile device based at least in part on the compensated phase difference.

2. The method of claim 1, wherein the plurality of data samples are quadrature samples obtained from the wireless signal.

3. The method of claim 1, wherein the antenna switching pattern includes a third switching pattern, and the third switching pattern is deducible from the at least two different switching patterns.

4. The method of claim 1, wherein the carrier frequency offset and frequency drift cancellation further includes:
    when the antenna switching pattern is a first switching pattern:
        summing a first number of phase differences of consecutive data samples from the plurality of data samples to obtain an estimate of residual carrier frequency offset and frequency drift; and
        subtracting the estimate of residual carrier frequency offset and frequency drift from each phase difference to obtain the respective compensated phase difference.

5. The method of claim 4, wherein the first number is equivalent to a number of transmitting or receiving antennas that are involved in the first switching pattern.

6. The method of claim 4, wherein the carrier frequency offset and frequency drift cancellation further includes:
    when the antenna switching pattern is a second switching pattern:
        applying phase wrap error correction to a second number of phase differences of consecutive data samples from the plurality of data samples;
        calculating differences between the second number of phase differences of consecutive data samples after the phase wrap error correction; and
        obtaining the compensated phase difference from the calculated differences between the second number of phase differences of consecutive data samples.

7. The method of claim 6, wherein the compensated phase difference reduces residual carrier frequency offset and frequency drift from the phase difference to half.

8. The method of claim 6, wherein the second number of phase differences includes consecutive pairs of phase differences.

9. The method of claim 8, wherein the phase wrap error correction further includes:
    adding a phase wrap error correction value to a pair of phase differences from the consecutive pairs of phase differences when the respective pair satisfies a threshold condition.

10. The method of claim 9, wherein the threshold condition includes at least one of:
    a sum of signs of the pair of phase differences being non-zero; and
    a sum of absolute values of the pair of phase differences being greater than a programmable threshold.

11. A system for carrier frequency offset and frequency drift cancellation based indoor position estimation, the system comprising:
    a receiving antenna configured to receive, from a mobile device, a wireless signal including a plurality of data samples;
    a demodulation module configured to obtain, from the wireless signal, information relating to an antenna switching pattern for transmitting or receiving the wireless signal, wherein the antenna switching pattern is selected from a set of antenna switching patterns, and each of the set of antenna switching patterns includes at least one reference antenna and at least one non-reference antenna;
    a phase difference module configured to calculate a phase difference associated with each data sample of plurality of data samples;
    a carrier frequency offset and frequency drift cancellation module configured to obtain a compensated phase difference from the calculated phase difference; and
    an indoor positioning module configured to generate a direction estimate of the mobile device based at least in part on the compensated phase difference.

12. The system of claim 11, wherein the plurality of data samples are quadrature samples obtained from the wireless signal.

13. The system of claim 11, wherein the antenna switching pattern includes a third switching pattern, and the third switching pattern is deducible from the at least two different switching patterns.

14. The system of claim 11, wherein the carrier frequency offset and frequency drift cancellation module is further configured to:
when the antenna switching pattern is a first switching pattern:
sum a first number of phase differences of consecutive data samples from the plurality of data samples to obtain an estimate of residual carrier frequency offset and frequency drift; and
subtract the estimate of residual carrier frequency offset and frequency drift from each phase difference to obtain the respective compensated phase difference.

15. The system of claim 14, wherein the first number is equivalent to a number of transmitting or receiving antennas that are involved in the first switching pattern.

16. The system of claim 14, wherein the carrier frequency offset and frequency drift cancellation module is further configured to:
when the antenna switching pattern is a second switching pattern:
apply phase wrap error correction to a second number of phase differences of consecutive data samples from the plurality of data samples;
calculate differences between the second number of phase differences of consecutive data samples after the phase wrap error correction; and
obtain the compensated phase difference from the calculated differences between the second number of phase differences of consecutive data samples.

17. The system of claim 16, wherein the compensated phase difference reduces residual carrier frequency offset and frequency drift from the phase difference to half.

18. The system of claim 16, wherein the second number of phase differences includes consecutive pairs of phase differences.

19. The system of claim 18, wherein the phase wrap error correction further includes:
adding a phase wrap error correction value to a pair of phase differences from the consecutive pairs of phase differences when the respective pair satisfies a threshold condition.

20. The system of claim 19, wherein the threshold condition includes at least one of:
a sum of signs of the pair of phase differences being non-zero; and
a sum of absolute values of the pair of phase differences being greater than a programmable threshold.

* * * * *